J. H. BLAKE.
WEEDING AND PRUNING IMPLEMENT.
APPLICATION FILED AUG. 10, 1909.
946,322.
Patented Jan. 11, 1910.
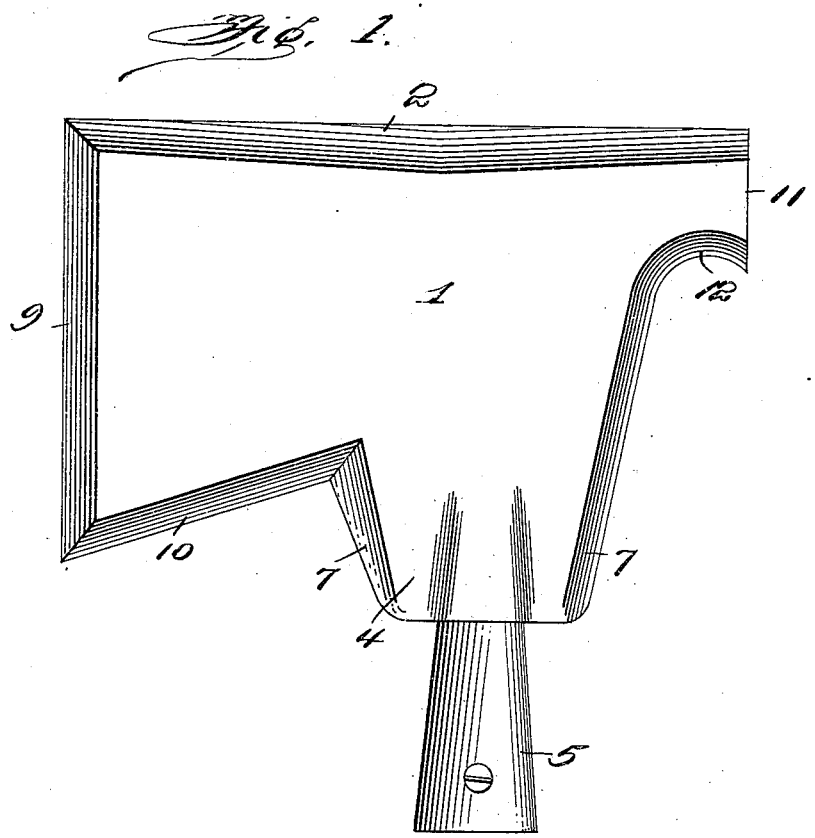
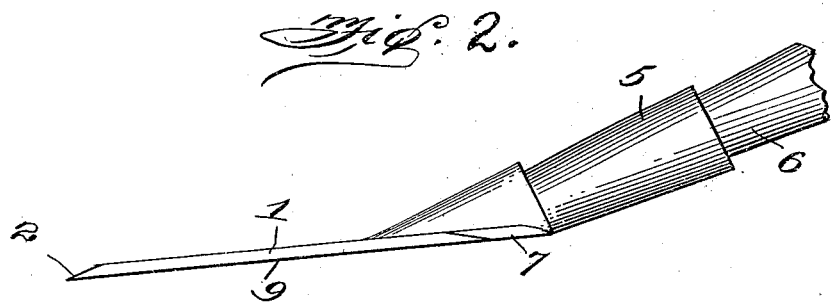

UNITED STATES PATENT OFFICE.

JOHN H. BLAKE, OF GODWIN, NORTH CAROLINA.

WEEDING AND PRUNING IMPLEMENT.

946,322. Specification of Letters Patent. Patented Jan. 11, 1910.

Application filed August 10, 1909. Serial No. 512,228.

*To all whom it may concern:*

Be it known that I, JOHN H. BLAKE, a citizen of the United States, residing at Godwin, in the county of Cumberland and State of North Carolina, have invented new and useful Improvements in Weeding and Pruning Implements, of which the following is a specification.

The present invention provides an implement useful for a variety of purposes, such as pruning, weeding and clearing out trenches and ditches, and which may be employed for edging lawns and removing brush and briars, and which is adapted for gardening generally.

The invention consists of the novel features, details of construction and combination of parts, which will be more particularly set forth, illustrated in the accompanying drawing and pointed out in the appended claim.

Referring to the drawing, forming a part of the specification, Figure 1 is a front view of an implement embodying the invention, and Fig. 2 is an edge view thereof.

Corresponding and like parts are referred to in the following description, and indicated in all the views of the drawing, by the same reference characters.

The implement comprises a blade 1 and socket 5 which may be of integral formation or separately provided and connected in any substantial way. The blade is provided at its outer or forward edge with a cutting edge 2, which is straight and the middle portion is widened, as indicated at 4, and made slightly tapering, the opposite edges 7 being sharpened. The straight cutting edge 2 is used chiefly for weeding grass and in operation is pressed forward and rocked backward and forward to cause the edge to penetrate the sod or other object to be cut or trimmed. The blade is sharpened at one end, as 9, to provide a hatchet blade for cutting brush and chopping out heavy undergrowth and for use wherever a broad ax may be advantageously employed.

The rear edge 10 inclines to the adjacent cutting edge 7, forming a hook intended primarily for pruning purposes. The end 11 is considerably narrower than the end provided with a straight cutting edge 9 and its rear edge is formed into a hook 12 and is sharpened, the cutting edge merging into the adjacent cutting edge 7. The cutting edges 7 and 12 form in effect a briar hook, which is designed for cutting briars and brush in ditch banks and around fences and inaccessible places. The corner cutting edges are designed for use in clearing out under walls, fences and around railroad ties and other places in which sharp cutting edges are desirable in order to remove weeds and other objectionable growths.

It will be understood from the foregoing, taken in connection with the accompanying drawing, that the invention provides an implement adapted for various uses, such as edging lawns, removing growths from beneath fences or walls and for pruning generally. The implement also is adapted for use as a scuffle hoe, the inclined position of the socket 5 enabling the blade 1 to lie close upon the ground while being operated by means of the handle bar.

From the foregoing description, taken in connection with the accompanying drawings, the advantages of the construction and the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim as new, is:—

An implement comprising a flat blade having its middle portion widened and tapered, and having one end upon one side of the tapered portion contracted and formed into a hook, and having the rear edge of the end portion upon the opposite side of the tapered part inclined, said blade having its front edge straight and sharpened, and having the outer edge of the broad end sharpened to provide a hatchet blade, and said blade further having the opposite edges of its widened tapered portion sharpened and having the rear edges of the end portions sharpened to provide a briar hook and a pruning hook.

In testimony whereof I affix my signature in presence of two witnesses.

JOHN H. BLAKE.

Witnesses:
L. R. PARKER,
J. W. McLEAN.